(12) United States Patent
Shimizu et al.

(10) Patent No.: US 8,774,564 B2
(45) Date of Patent: Jul. 8, 2014

(54) OPTICAL WAVEGUIDE ELEMENT MODULE

(75) Inventors: Ryo Shimizu, Chiyoda-ku (JP);
Shinsuke Kanno, Chiyoda-ku (JP);
Toru Sugamata, Chiyoda-ku (JP)

(73) Assignee: Sumitomo Osaka Cement Co., Ltd.,
Chiyoda-ku, Tokyo (JP)

( * ) Notice: Subject to any disclaimer, the term of this patent is extended or adjusted under 35 U.S.C. 154(b) by 65 days.

(21) Appl. No.: 12/736,259

(22) PCT Filed: Mar. 6, 2009

(86) PCT No.: PCT/JP2009/054259
§ 371 (c)(1),
(2), (4) Date: Sep. 24, 2010

(87) PCT Pub. No.: WO2009/119282
PCT Pub. Date: Oct. 1, 2009

(65) Prior Publication Data
US 2011/0013863 A1 Jan. 20, 2011

(30) Foreign Application Priority Data
Mar. 28, 2008 (JP) .................................. 2008-087593

(51) Int. Cl.
*G02F 1/035* (2006.01)
(52) U.S. Cl.
USPC .............................................. 385/2; 359/237
(58) Field of Classification Search
USPC ........ 385/2, 14, 131, 1, 8; 359/237, 240, 245, 359/254
See application file for complete search history.

(56) References Cited

U.S. PATENT DOCUMENTS

| 5,973,911 | A * | 10/1999 | Nishioka ........................ 361/313 |
| 6,674,927 | B2 | 1/2004 | Ibukuro |
| 7,263,244 | B2 | 8/2007 | Tanaka et al. |
| 2003/0086635 | A1 * | 5/2003 | Bylsma et al. .................. 385/14 |
| 2004/0114845 | A1 * | 6/2004 | Cheung et al. ................. 385/2 |
| 2004/0240765 | A1 * | 12/2004 | Wooten et al. .................... 385/2 |
| 2006/0067599 | A1 * | 3/2006 | Bull et al. ......................... 385/2 |
| 2007/0003180 | A1 * | 1/2007 | Tanaka et al. ..................... 385/2 |
| 2007/0047878 | A1 * | 3/2007 | Choi et al. ...................... 385/88 |
| 2007/0286552 | A1 * | 12/2007 | Aalto .............................. 385/50 |
| 2010/0027934 | A1 | 2/2010 | Shimizu et al. |

FOREIGN PATENT DOCUMENTS

| JP | 11-183858 A | 7/1999 |
| JP | 2001-249309 A | 9/2001 |
| JP | 2001-332441 A | 11/2001 |
| JP | 2002-287103 A | 10/2002 |
| JP | 2003-295139 A | 10/2003 |
| JP | 2006-263962 A | 10/2006 |
| JP | 2007-010942 A | 1/2007 |
| JP | 2008-083449 A | 4/2008 |

* cited by examiner

*Primary Examiner* — Mark Robinson
*Assistant Examiner* — Peter Radkowski
(74) *Attorney, Agent, or Firm* — Taft Stettinius & Hollister LLP

(57) ABSTRACT

Disclosed is an optical waveguide element module in which a filter circuit including a capacitor is provided on a line through which a modulation signal is input to a modulating electrode of an optical waveguide element. The module is capable of preventing the deterioration of an electric signal in the filter circuit or the occurrence of a resonance phenomenon within the frequency range used and obtaining flat electrical/optical response frequency characteristics in a wide band of more than several tens of gigahertz. The capacitor is a single-layer capacitor and the relative permittivity of a dielectric in the capacitor is equal to or less than 1000.

7 Claims, 2 Drawing Sheets

US 8,774,564 B2

OPTICAL WAVEGUIDE ELEMENT MODULE

TECHNICAL FIELD

The present invention relates to an optical waveguide element module, and more particularly, to an optical waveguide element module in which a filter circuit including a capacitor is provided on a line through which a modulation signal is input to a modulating electrode of an optical waveguide element.

BACKGROUND ART

In the related art, in the field of optical communication or optical measurement, an optical waveguide element, such as an optical modulator, in which an optical waveguide is formed on a substrate having an electro-optical effect has been generally used as a means for controlling a light wave.

In recent years, when the optical waveguide element is evaluated, a characteristic called jitter, which indicates a variation over time in the optical signal obtained when the optical waveguide element is driven, has drawn attention. Jitter is an index indicating a variation in the optical signal over time and is defined as the width of the cross area of the signal when the optical eye pattern waveforms are added.

In order to reduce the jitter of the optical signal obtained when the optical waveguide element is driven, it is necessary to improve the following characteristics of the optical waveguide element or a driver for driving and controlling the optical waveguide element.

(1) Driver

The gain has flat frequency characteristics from a low frequency band to a high frequency band such that an input electric signal is amplified without any deterioration.

(2) Optical Waveguide Element

An electrical/optical conversion response frequency has flat frequency characteristics from the low frequency band to the high frequency band such that an input electric signal is converted into an optical signal without any deterioration.

As described above, when the frequency characteristics of the driver and the optical waveguide element are infinitely flat (without frequency dependency), the jitter does not occur. In practice, the frequency characteristics of the driver and the optical modulator in the low frequency band are not flat, or the frequency characteristics thereof in the high frequency band tend to deteriorate toward the right. As a result, the jitter occurs. In particular, in the optical waveguide element with a gigahertz-order transmission rate, the occurrence of the jitter is a serious problem.

As a method of making the response characteristics of the electric signal applied to the optical waveguide element and the light wave output from the optical waveguide element flat, as shown in FIG. 1, the following method is used: a method of applying the modulation signal of a driver 6 to a modulating electrode 3 of the optical waveguide element through a relay substrate 7, such as a filter circuit; or a method of connecting a termination circuit 8, such as a termination resistor, to an end portion of the modulating electrode 3. The optical waveguide element shown in FIG. 1 includes an optical waveguide 2 that is formed on a substrate 1 having an electro-optical effect and the modulating electrode 3 for modulating the light wave propagated through the optical waveguide 2 (the modulating electrode includes a signal electrode and a ground electrode, but only the arrangement of the signal electrode is shown in FIG. 1 for simplicity). In addition, an optical fiber 4 for input or an optical fiber 5 for output is connected to the optical waveguide element such that the light wave is incident on the optical waveguide element and is emitted from the optical waveguide element.

The optical waveguide element is accommodated in one housing 9 together with the relay substrate 7 or the termination circuit 8.

A structure using the termination circuit is disclosed in Patent Citation 1 in which the impedance of an end portion connected to the modulating electrode of the optical modulator is adjusted to improve the frequency characteristics of the optical modulator.

However, it is difficult to obtain flat frequency characteristics in a high frequency range enabling data to be transmitted at several tens of Gbps using only the termination circuit. In addition, it is difficult to change the frequency to be adjusted in the electrical/optical conversion response frequency characteristics of a traveling-wave-type optical modulator only by adjusting the impedance of the end portion as in Patent Citation 1.

Patent Citation 1: Japanese Patent No. 3088988

Patent Citation 2 or 3 discloses a structure using a relay substrate including a filter circuit. In order to obtain flat electrical/optical response frequency characteristics, a high-pass filter shown in FIG. 2 in which a capacitor 10 and a resistor 11 are connected in parallel to each other is used as the basic structure of the filter circuit. In FIG. 2, reference numerals 12 and 13 indicate electric lines and reference numeral 7 indicates a relay substrate including a filter circuit.

Patent Citation 2: JP-A-2007-10942

Patent Citation 3: Japanese Patent Application No. 2006-263962 (filed on Sep. 28, 2006)

In particular, Patent Citation 2 discloses a structure in which a capacitor or a resistor of the filter circuit provided on the relay substrate is formed by a plurality of thin films on the electric line.

The circuit structure using the thin films contributes to reducing the size of the filter circuit, but makes a manufacturing process complicated. In particular, a process of forming and removing the thin film needs to be performed a plurality of times in order to form the capacitor with the thin film. In addition, it is necessary to adjust the value of the capacitor or the resistor according to the frequency characteristics of the optical waveguide element. In the case of the resistor, it is possible to easily adjust the value thereof simply by trimming a portion of the thin film. However, in the case of the capacitor, when trimming is performed, a short circuit is likely to occur between the electrodes. Therefore, it is difficult to adjust the value of the capacitor.

The inventors made an attempt to use a single-layer capacitor as the capacitor to solve the above-mentioned problems.

Specifically, as shown in FIG. 3, electric lines 12 and 13 were formed on a relay substrate body 14 and a single-layer capacitor 10 was provided on the electric line 12. When the single-layer capacitor was provided on the electric line, an electrode on the lower surface of the single-layer capacitor was electrically connected to the electric line 12, and a conductive wire 20, such as a gold wire, was connected to an electrode on the upper surface of the single-layer capacitor such that the electrode was electrically connected to the electric line 13.

As shown in FIG. 4 (a perspective view illustrating the capacitor), electrodes 15 and 17 are formed in the single-layer capacitor with a dielectric 16 interposed therebetween. When the relative permittivity of the dielectric is $\epsilon_r$, the permittivity of air is $\epsilon_0$, the areas of the electrodes 15 and 17 are S, and the distance between the electrodes 15 and 17 is d, capacitance C is represented by the following expression:

$$\text{Capacitance } C = \epsilon_r \cdot \epsilon_0 \cdot S/d$$

In general, since the high frequency characteristics of the single-layer capacitor are better than those of a laminated ceramic capacitor, the single-layer capacitor is generally used in a device for which high frequency characteristics are an important factor.

In order to change the capacitance of the single-layer capacitors with the same size, the thickness (the gap d between the electrodes) of the single-layer capacitor is changed. However, in this case, it is necessary to pay attention to a change in characteristics caused by the thickness of the capacitor.

In particular, in the case of the filter circuit, when the capacitor is thick, a resonance phenomenon (resonance frequency $f_0$) occurs in electrical/optical response frequency characteristics 30 shown in FIG. 5 in a specific frequency range. As a result, high frequency characteristics deteriorate.

DISCLOSURE OF INVENTION

Technical Problem

The invention has been made in order to solve the above-mentioned problems and an object of the invention is to provide an optical waveguide element module in which a filter circuit including a capacitor is provided on a line through which a modulation signal is input to a modulating electrode of an optical waveguide element and which is capable of preventing the deterioration of an electric signal in the filter circuit or the occurrence of a resonance phenomenon within the frequency range used and obtaining flat electrical/optical response frequency characteristics in a wide band of more than several tens of gigahertz, even though a single-layer capacitor is used as the capacitor.

Technical Solution

In order to achieve the object, according to a first aspect of the invention, an optical waveguide element module includes: an optical waveguide element including a substrate that is made of a material having an electro-optical effect, an optical waveguide that is formed on the substrate, and a modulating electrode that modulates a light wave propagated through the optical waveguide; and a filter circuit that is provided on a line through which a modulation signal is input to the modulating electrode and includes a capacitor. The capacitor is a single-layer capacitor and the relative permittivity of a dielectric in the capacitor is equal to or less than 1000.

In the invention, the term "optical waveguide element module" means a structure in which the filter circuit is connected to the optical waveguide element, but is not limited to the structure shown in FIG. 1 in which the optical waveguide element and the filter circuit are accommodated in one housing 9. In FIG. 1, the filter circuit is provided on the relay substrate 7, but the invention is not limited thereto. The filter circuit may be mounted on the substrate having the optical waveguide element formed thereon, which is also included in the technical scope of the invention.

According to a second aspect of the invention, in the optical waveguide element module according to the first aspect, the single-layer capacitor may be arranged in the filter circuit such that an electrode on the lower surface of the single-layer capacitor contacts one of a plurality of electric lines formed on a filter circuit board, and an electrode on the upper surface of the single-layer capacitor may be connected to another electric line by a conductive wire.

According to a third aspect of the invention, in the optical waveguide element module according to the first or second aspect, the filter circuit may include an electrical resistor formed by a film that is provided on the filter circuit board.

According to a fourth aspect of the invention, in the optical waveguide element module according to any one of the first to third aspects, a termination circuit may be connected to an end portion of the modulating electrode.

Advantageous Effects

According to the first aspect of the invention, the optical waveguide element module includes: the optical waveguide element including the substrate that is made of a material having an electro-optical effect, the optical waveguide that is formed on the substrate, and the modulating electrode that modulates the light wave propagated through the optical waveguide; and the filter circuit that is provided on the line through which the modulation signal is input to the modulating electrode and includes the capacitor. The capacitor is a single-layer capacitor and the relative permittivity of a dielectric in the capacitor is equal to or less than 1000. According to this structure, even though the single-layer capacitor is used in the filter circuit, it is possible to achieve low capacitance while preventing an increase in the distance d between the electrodes of the capacitor since the relative permittivity is low. In this way, it is possible to provide an optical waveguide element module capable of preventing the deterioration of an electric signal in the filter circuit or the occurrence of a resonance phenomenon within the frequency range used and obtaining flat electrical/optical response frequency characteristics in a wide band of more than several tens of gigahertz.

According to the second aspect of the invention, the single-layer capacitor is arranged in the filter circuit such that the electrode on the lower surface of the single-layer capacitor contacts one of a plurality of electric lines formed on the filter circuit board, and the electrode on the upper surface of the single-layer capacitor is connected to another electric line by the conductive wire. According to this structure, it is easy to electrically connect the electrode on the upper surface of the single-layer capacitor and the electric line and it is possible to reduce the height of the single-layer capacitor used in the invention. Therefore, it is possible to prevent an increase in the length of the conductive wire and prevent the occurrence of the resonance phenomenon in the frequency range used in the electrical/optical response frequency characteristics.

According to the third aspect of the invention, the filter circuit includes the electrical resistor formed by a film that is provided on the filter circuit board. According to this structure, it is possible to reduce the size of the electrical resistor of the filter circuit and easily adjust the resistance value using, for example, trimming. As a result, the capacitance of the capacitor is adjusted by replacing a laminated ceramic capacitor or using a plurality of laminated ceramic capacitors, and the resistance value of the electrical resistor is adjusted by, for example, trimming. Therefore, it is possible simply adjust the filter circuit suitable for each optical waveguide element.

According to the fourth aspect of the invention, the termination circuit is connected to the end portion of the modulating electrode. According to this structure, it is possible to obtain a flat electrical/optical response frequency by a combination of the filter circuit and the termination circuit. Therefore, it is possible to perform a process of making the frequency characteristics flat with respect to various optical waveguide elements. In addition, it is possible to improve reflection characteristics (S11 characteristics) of the optical waveguide element through the termination circuit.

EXPLANATION OF REFERENCES

1: SUBSTRATE
2: OPTICAL WAVEGUIDE
3: SIGNAL ELECTRODE
4: OPTICAL FIBER FOR INPUT
5: OPTICAL FIBER FOR OUTPUT
6: DRIVER
7: RELAY SUBSTRATE
8: TERMINATION CIRCUIT
9: HOUSING
10: CAPACITOR (SINGLE-LAYER CAPACITOR)
11: ELECTRICAL RESISTOR (FILM RESISTOR)
12, 13: ELECTRIC LINE
14: RELAY SUBSTRATE BODY (FILTER CIRCUIT BOARD)
15, 17: ELECTRODE
16: DIELECTRIC
20: CONDUCTIVE WIRE
30: ELECTRICAL/OPTICAL RESPONSE FREQUENCY CHARACTERISTICS

BEST MODE FOR CARRYING OUT THE INVENTION

Hereinafter, the invention will be described in detail using preferred embodiments.

According to the invention, an optical waveguide element module includes: an optical waveguide element including a substrate that is made of a material having an electro-optical effect, an optical waveguide that is formed on the substrate, and a modulating electrode that modulates a light wave propagated through the optical waveguide; and a filter circuit that is provided on a line through which a modulation signal is input to the modulating electrode and includes a capacitor. The capacitor is a single-layer capacitor and the relative permittivity of a dielectric in the capacitor is equal to or less than 1000.

Figure 1:
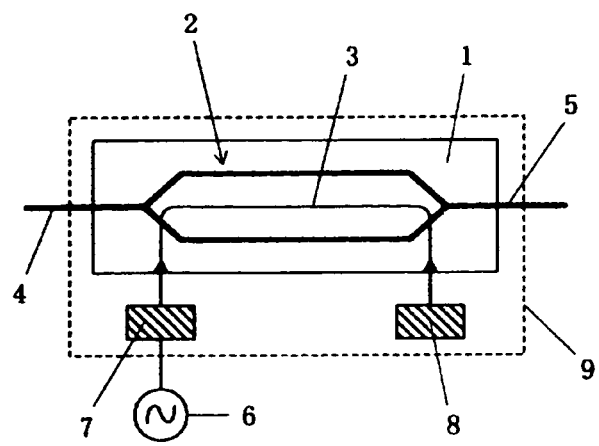
FIG. 1 is a diagram schematically illustrating an optical waveguide element module.
Figure 2:
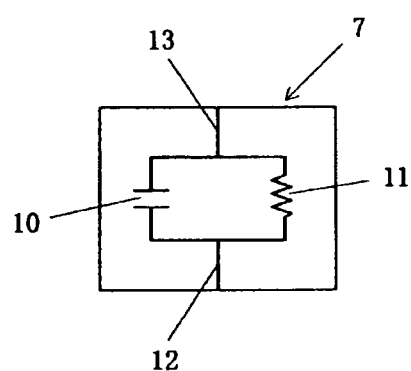
FIG. 2 is a diagram illustrating an example of a filter circuit.

The optical waveguide element module according to the invention has the same basic structure as that according to the related art shown in FIG. 1 except that a specific single-layer capacitor is used. Therefore, it is possible to easily obtain an optical waveguide element module with flat electrical/optical response frequency characteristics without greatly changing the manufacturing process according to the related art.

The optical waveguide element according to the invention will be described.

A substrate 1 has the electro-optical effect and is made of, for example, lithium niobate, lithium tantalate, PLZT (lead lanthanum zirconate titanate), and a quartz-based material. Specifically, the substrate 1 is made of an X-cut plate, a Y-cut plate, and a Z-cut plate of these monocrystalline materials. In particular, it is preferable that the substrate 1 be made of lithium niobate (LN) since the lithium niobate facilitates the configuration of an optical waveguide device and has large anisotropy.

An optical waveguide 2 is a so-called Mach-Zehnder optical waveguide and may be formed by dispersing, for example, titanium (Ti) on the surface of the substrate 1 using a thermal diffusion method or a proton-exchange method. As another method, as disclosed in Patent Citation 4, a ridge structure is formed in a portion corresponding to an optical waveguide, thereby forming the optical waveguide. In addition, the method using, for example, Ti and the ridge structure may be combined with each other.

Patent Citation 4: JP-A-6-289341

In order to modulate the light wave propagated through the optical waveguide 2, the modulating electrode is provided on the upper side of the optical waveguide 2 or in the vicinity thereof, if necessary.

The modulating electrode may be formed on the front surface or the rear surface of the substrate 1 by, for example, the formation of a Ti.Au electrode pattern and a gold plating method. In addition, the modulating electrode includes a signal electrode 3 through which a modulation signal (an AC signal or a DC signal) is propagated and a ground electrode which is provided around the signal electrode.

Although not particularly shown in the drawings, a buffer layer made of, for example, $SiO_2$ may be formed between the substrate 1 and the modulating electrode. In this case, it is possible to effectively prevent the light wave propagated through the optical waveguide from being absorbed or scattered by the modulating electrode. In addition, this structure also contributes to the speed matching between the modulation signal applied to the modulating electrode and the light wave traveling in the optical waveguide.

Figure 3:
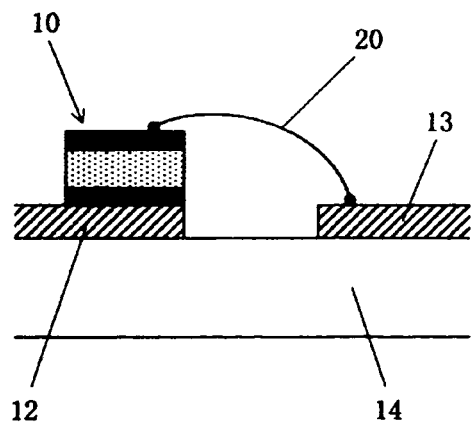
FIG. 3 is a diagram illustrating the arrangement of a single-layer capacitor in a filter circuit.
Figure 4:
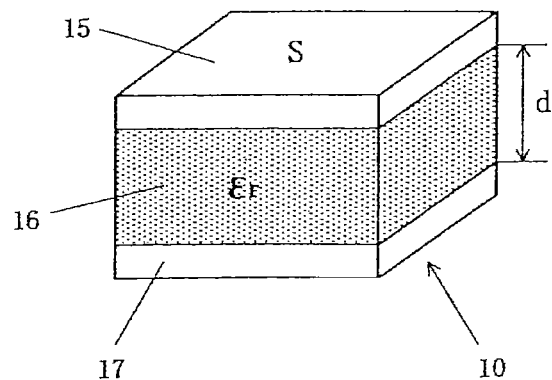
FIG. 4 is a perspective view illustrating the single-layer capacitor.
Figure 5:
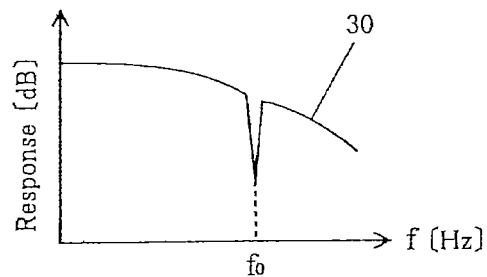
FIG. 5 is a diagram illustrating electrical/optical response frequency characteristics when the single-layer capacitor is used in the filter circuit.

In the optical waveguide element module according to the invention, a single-layer capacitor 10 is provided as shown in FIG. 3. Electric lines 12 and 13 are formed on a relay substrate body (the substrate forming the optical waveguide element may be used as the relay substrate body) 14. An electrode provided on the lower surface of the single-layer capacitor 10 is arranged so as to be electrically connected to the electric line 12, and a conductive wire 20, such as a gold wire, is connected to an electrode provided on the upper surface of the single-layer capacitor 10 such that the electrode is electrically connected to the electric line 13.

The relative permittivity of a dielectric in the single-layer capacitor provided in the filter circuit is equal to or less than 1000. In this case, when the area S of the electrode is in the range of about 0.04 $mm^2$ to 0.2 $mm^2$, it is possible to reduce the distance d between the electrodes to 0.05 mm or less and prevent a resonance frequency from being generated at 20 GHz or less. In addition, it is possible to obtain a capacitance C of 3 pF or less. The use of the single-layer capacitor having the above-mentioned structure makes it possible to achieve a high-pass filter that effectively transmits a signal frequency of about 25 GHz or more.

In order to form electrical resistance in the filter circuit, a chip-type resistor may be used. Alternatively, an electrical resistor formed by a film made of, for example, $Ti_2N$ which is provided on the substrate 14 may be used as disclosed in Patent Citation 2. The film electrical resistor makes it possible to reduce the size of the electrical resistor in the filter circuit and easily adjust the resistance value by, for example, trimming.

Figure 6:
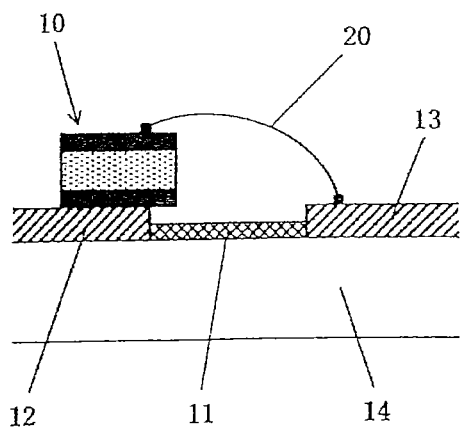
FIG. 6 is a diagram illustrating an aspect of the filter circuit including the single-layer capacitor and a film electrical resistor.

As shown in FIG. 6, when the thickness of the film resistor is smaller than that of the electric line, the single-layer capacitor 10 may be arranged so as to protrude toward the electrical resistor 11, thereby reducing the length of the conductive wire connecting the electrode on the upper surface of the single-layer capacitor and the electric line 13. When the film resistor is not provided as shown in FIG. 3, similarly, the single-layer capacitor may be arranged so as to protrude from the electric line 12.

In the optical waveguide element module according to the invention, as shown in FIG. 1, a termination circuit 8 may be connected to an end portion of the modulating electrode. In this way, as disclosed in Patent Citations 1 to 3, it is possible to obtain the effect of making the electrical/optical response frequency of the termination circuit flat or the effect of improving the reflection characteristics (S11 characteristics) of the optical waveguide element. In particular, it is possible to obtain the synergistic effect by a combination with the filter circuit according to the invention.

INDUSTRIAL APPLICABILITY

As described above, according to the invention, in the optical waveguide element module in which the filter circuit including the capacitor is provided on the line through which the modulation signal is input to the modulating electrode of the optical waveguide element, even though a single-layer capacitor is used as the capacitor, it is possible to prevent the deterioration of the electric signal in the filter circuit or the occurrence of a resonance phenomenon within the frequency range used and obtain flat electrical/optical response frequency characteristics in a wide band of more than several tens of gigahertz.

The invention claimed is:

1. An optical modulator comprising:
an optical waveguide element comprising an optical waveguide substrate made of a material having an electro-optical effect, a Mach-Zehnder optical waveguide formed on the optical waveguide substrate, and a modulating electrode that modulates a light wave propagated through the Mach-Zehnder optical waveguide; and
a filter circuit provided on a modulation signal input line that inputs a modulation signal to the modulating electrode, wherein
the filter circuit comprises a capacitor that is a single-layer capacitor having a dielectric having relative permittivity that is equal to or less than 1000,
the filter circuit is formed on a filter circuit board provided outside the optical waveguide substrate,
the filter circuit obtains flat frequency characteristics of the optical modulator,
a distance between electrodes of the capacitor is 0.05 mm or less, and
the filter circuit generates a resonance frequency at higher than 20 GHz.

2. The optical modulator according to claim 1,
wherein the single-layer capacitor is arranged in the filter circuit such that an electrode on a lower surface of the single-layer capacitor is electrically connected to a first one of a plurality of electric lines formed on the filter circuit board, and
an electrode on an upper surface of the single-layer capacitor is electrically connected to a second one of the plurality of electric lines formed on the filter circuit board by a conductive wire.

3. The optical modulator according to claim 1,
wherein the filter circuit comprises an electrical resistor formed by a film provided on the filter circuit board.

4. The optical modulator according to claim 1,
wherein a termination circuit is connected to an end portion of the modulating electrode.

5. The optical modulator according to claim 2,
wherein the filter circuit comprises an electrical resistor formed by a film provided on the filter circuit board.

6. The optical modulator according to claim 2,
wherein a termination circuit is connected to an end portion of the modulating electrode.

7. The optical modulator according to claim 3,
wherein a termination circuit is connected to an end portion of the modulating electrode.

* * * * *